(12) United States Patent
Camenisch et al.

(10) Patent No.: US 8,819,439 B2
(45) Date of Patent: *Aug. 26, 2014

(54) ATTRIBUTES IN CRYPTOGRAPHIC CREDENTIALS

(75) Inventors: Jan Leonhard Camenisch, Zurich (CH); Thomas R Gross, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/594,306

(22) Filed: Aug. 24, 2012

(65) Prior Publication Data

US 2012/0324231 A1    Dec. 20, 2012

Related U.S. Application Data

(63) Continuation of application No. 12/548,699, filed on Aug. 27, 2009, now Pat. No. 8,281,131.

(30) Foreign Application Priority Data

Aug. 28, 2008 (EP) .................................... 08105172
Aug. 28, 2008 (EP) .................................... 08105173

(51) Int. Cl.
*H04L 29/06* (2006.01)

(52) U.S. Cl.
USPC ........... 713/175; 713/150; 713/168; 713/174; 713/180; 726/2; 726/5

(58) Field of Classification Search
None
See application file for complete search history.

(56) References Cited

U.S. PATENT DOCUMENTS

| 6,189,036 | B1 | 2/2001 | Kao |
| 6,871,276 | B1 * | 3/2005 | Simon ........................... 713/156 |
| 8,001,384 | B2 | 8/2011 | Yamamoto et al. |
| 2007/0121936 | A1 | 5/2007 | Guillou et al. |
| 2007/0226798 | A1 | 9/2007 | Sibert |
| 2008/0152148 | A1 | 6/2008 | Sudhakar et al. |
| 2008/0162484 | A1 | 7/2008 | Yoshida |
| 2008/0165956 | A1 | 7/2008 | Zhu et al. |

OTHER PUBLICATIONS

J. Camenisch, et al., "A Signature Scheme with Efficient Protocols", Security in Communications Networks, Third Intl. Conference, SCN 2002, vol. 2576, pp. 268-289, 2003.

J. Camenisch, et al., "An Efficient System . . . Revocation", Advances in Cryptology—Eurocrypt 2001, Vo. 2045 of Lecture Notes in Computer Science, pp. 93-118, 2001.

(Continued)

*Primary Examiner* — Jung Kim
*Assistant Examiner* — Adrian Stoica
(74) *Attorney, Agent, or Firm* — Vazken Alexanian

(57) ABSTRACT

Method and apparatus for generating cryptographic credentials certifying user attributes and making cryptographic proofs about attributes encoded in such credentials. Attributes are encoded as prime numbers E in accordance with a predetermined mapping and a cryptographic credential is generated encoding E. To prove that an attribute encoded in a cryptographic credential associated with a proving module of the system is a member of a predetermined set of user attributes, without revealing the attribute in question, the proving module determines the product Q of respective prime numbers corresponding to the attributes in the set in accordance with the predetermined mapping of attributes to prime numbers. The proving module demonstrates to the receiving module possession of a cryptographic credential encoding a secret value that is the prime number E, and then whether this secret value divides the product value Q.

24 Claims, 3 Drawing Sheets

(56) References Cited

OTHER PUBLICATIONS

R.L. Rivest, et al., "A Method for Obtaining . . . Cryptosystems", Communications of the ACM, 21(2): 120-126. Feb. 1978.

T. Pedersen, "Non-Interactive and Information . . . Sharing", Advances in Cryptology—CRYPTO '91, vol. 576 of Lecture Notes in Computer Science, pp. 129-140, 1992.

I. Damgard, et al., "An Integer Commitment . . . Order", http://eprint.iacr.org/2001, 2001.

J. Camenisch, et al., "Efficient Group Signature . . . Groups", Advances in Cryptology—CRYPTO '97, vol. 1296 of Lecture Notes in Computer Science, pp. 410-424, 1997.

A. Fiat, et al., "How to Prove Yourself, . . . Problems", Advances in Cryptology—CRYPTO '86, vol. 263 of Lecture Notes in Computer Science, pp. 186-194, 1987.

\* cited by examiner

ATTRIBUTES IN CRYPTOGRAPHIC CREDENTIALS

CROSS REFERENCE TO RELATED APPLICATIONS

This application is a continuation of and claims priority from U.S. application Ser. No. 12/548,699 filed on Aug. 27, 2009, which in turn claims priority under 35 U.S.C. 119 from European Patent Applications 08105173.2 and 08105172.4, both filed Aug. 28, 2008, the entire contents of all of the aforementioned applications are incorporated herein by reference.

BACKGROUND OF THE INVENTION

1. Field of the Invention

The present invention relates generally to encoding of attributes in cryptographic credentials. More particularly it relates to proofs about attributes so encoded. Still more particularly, aspects of the present invention relate to so-called anonymous credential systems.

2. Description of Related Art

Cryptographic credentials are used in a variety of security and privacy-sensitive applications to enable a user or proving party (the "prover"), to prove certain information to a verifying party (the "verifier"). Such a credential is essentially a certificate generated via a cryptographic process by an issuing party (the "issuer") who has in some manner verified the information for which the credential is issued. The issuer, who may be the verifier but is more typically a trusted third party, supplies the credential to the user who can then use the credential as verification of the information when required. Credentials might be transmitted over data communications channels to a user's receiving module, such as a personal computer or mobile phone, or can be recorded on some information storage medium such as a chip or card which is supplied to the user.

Typical applications include government or electronic ID cards which encode personal or security-sensitive information. Such a card might be inserted in some form of reader module, with communication occurring between the card reader and a processor on the card, or between the reader and a remote verifier module, to perform a cryptographic verification process. There are also numerous applications involving access to services or other resources via data communications networks such as the Internet or telecommunications networks. An exemplary system might involve a user with a laptop, a mobile phone or other data processing module in communication with a remote server via the Internet, with verification of an appropriate cryptographic credential being required before the user is permitted access to a restricted web site.

Information is certified by a cryptographic credential via an encoding process whereby the information is represented by some value or function which is encoded in the credential via a cryptographic algorithm. Cryptographic proofs can be then be made about the credential and the information it encodes for subsequent verification purposes. Preferably, a credential system will be anonymous, allowing "zero-knowledge" proofs to be made which do not reveal any other information to a verifier than that which is to be proved. The items of information certified by cryptographic credentials are referred to generally herein as "user attributes". Such an attribute can be any item of information attributed to a user, relating, for example, to some property, quality, feature or other item belonging to, describing or otherwise associated with the user, where the "user" here may in general be a person or a module.

Various different types of attributes might be utilized in credential systems. For example, binary attributes are attributes which can either be present or not, in essence flags indicating either true or false, e.g. whether a user is a civil servant. Finite set attributes provide another example. These are finite sets of discrete attribute values where a user may realize one possible value, examples here being hair colour, city of birth, security clearance and occupation. For simplicity, the term "attribute" is used herein to mean both "attribute" and "attribute value" as the context requires. Various other attribute types are possible as discussed below. Whatever the attribute type, for many applications the number of attributes to be encoded in cryptographic credentials can be very large.

There are currently two main approaches for encoding attributes in credentials as described above. The standard approach is to designate a message $m_j$ to an attribute and set $m_j$ to the encoded attribute value. This approach uses a whole message field per attribute. In more detail, attributes are distributed over multiple attribute bases so that each attribute is encoded in its own attribute base. That is, each attribute is encoded as one exponent $m_j$ in a discrete logarithm representation $g^{m_j}$ where g is the attribute base for that attribute.

An example of an anonymous credential system using this technique is the Camenisch-Lysyanskaya credential system which is discussed further below. This technique generates anonymous credentials by producing Camenisch-Lysyanskaya signatures on a message set including the encoded attribute values. Zero-knowledge proofs can then be made about the encoded attributes, e.g. to reveal one attribute to a verifier without revealing any others in the credential.

A common scenario is where a user wishes to prove that her credential encodes an attribute which is, or is not, a member of a given set, e.g. on a particular list of attributes, without revealing the attribute in question. For instance, a user may need to prove that her country of birth is (or is not) one of a given list of countries. A known method for doing this is to prove that the attribute encoded in the credential is either the first one, or the second one, or the third one, etc., of the attributes in the set (or conversely that the encoded attribute is not the first one, and is not the second one, and so on).

SUMMARY OF THE INVENTION

According to a first aspect of the present invention, a computer implemented method for generating a cryptographic credential for use in certifying a plurality of user attributes includes the steps of: encoding, in the computer, each attribute as a prime number in accordance with a predetermined mapping of attributes to prime numbers; calculating, in the computer, the product of the prime numbers encoding the attributes; and generating, in the computer, a cryptographic credential encoding the product for use in certification.

According to another aspect of the present invention, a computer implemented method is provided for determining, in a verifying module of a data processing system, whether a cryptographic credential associated with a proving module of the system certifies a specified user attribute. The cryptographic credential encodes the product E of a plurality of prime numbers, each encoding a respective user attribute in accordance with a predetermined mapping of attributes to prime numbers. The method includes the steps of: communicating with the verifying module to demonstrate possession of a cryptographic credential encoding E; and determining whether a prime number e encoding the specified attribute in accordance with the mapping divides the value E encoded in the credential, thus certifying the specified user attribute.

In a further aspect of the present invention, a computer implemented method for proving to a verifying module of a data processing system that a cryptographic credential associated with a proving module of the system certifies at least one of a predetermined set of user attributes is provided. The cryptographic credential encodes the product E of a plurality of prime numbers. Each prime number encodes a respective user attribute in accordance with a predetermined mapping of attributes to prime numbers. The method includes the steps of: demonstrating, to the verifying module, possession of a cryptographic credential encoding E; and communicating with the verifying module to prove possession of a secret number d which divides both the value E encoded in the credential and a value Q that is the product of respective prime numbers encoding the attributes in the set in accordance with the predetermined mapping of attributes to prime numbers. Possession of the secret number proves the certification.

In yet another aspect of the present invention, apparatus is provided for generating a cryptographic credential certifying a plurality of user attributes. The apparatus includes control logic adapted for: encoding each attribute as a prime number in accordance with a predetermined mapping of attributes to prime numbers; calculating the product of the prime numbers encoding the attributes; and generating a cryptographic credential encoding the product.

A still further aspect of the present invention provides a computer implemented method for determining, in a verifying module of a data processing system, whether a user attribute encoded in a cryptographic credential associated with a proving module of the system is a member of a predetermined set of user attributes. The cryptographic credential encodes the user attribute as a prime number E in accordance with a predetermined mapping of attributes to prime numbers. The method includes the steps of: determining, in the computer, a product value Q which is the product of respective prime numbers corresponding to the attributes in the set in accordance with the predetermined mapping of attributes to prime numbers; communicating with the verifying module to demonstrate possession of a cryptographic credential encoding a secret value that is the prime number E; and demonstrating to the verifying module, that the secret value divides the product value Q, thus demonstrating that the user attribute is a member of the set.

Another aspect of the present invention provides a computer implemented method for verifying, at a verifying module of a data processing system, whether a user attribute encoded in a cryptographic credential associated with a proving module of the system is a member of a predetermined set of user attributes. The cryptographic credential encodes the user attribute as a prime number E in accordance with a predetermined mapping of attributes to prime numbers. The method includes the steps of: communicating with the proving module to verify possession by the proving module of a cryptographic credential encoding a secret value E; and communicating with the proving module to determine whether the secret value divides a product value Q that is the product of respective prime numbers corresponding to the attributes in the set in accordance with the predetermined mapping of attributes to prime numbers.

Yet another aspect of the present invention provides a proving module of a data processing system for proving to a verifying module of the system whether a user attribute encoded in a cryptographic credential associated with the proving module is a member of a predetermined set of user attributes. The cryptographic credential encodes the user attribute as a prime number E in accordance with a predetermined mapping of attributes to prime numbers, the proving module includes a communications interface for communicating with the verifying module and control logic adapted to: determine a product value Q that is the product of respective prime numbers corresponding to the attributes in the set in accordance with the predetermined mapping of attributes to prime numbers; communicate with the verifying module via the communications interface to demonstrate possession of a cryptographic credential encoding a secret value being that is the prime number E; and communicate with the verifying module via the communications interface to prove whether the secret value divides the product value Q.

In accordance with other aspects of the invention, computer readable storage media are provided. The computer readable storage media include computer executable program instructions that, when executed, will cause a computer to perform one or more of the foregoing methods.

BRIEF DESCRIPTION OF THE DRAWINGS

Preferred embodiments of the present invention will now be described, by way of example, with reference to the accompanying drawings in which.

DETAILED DESCRIPTION OF PREFERRED EMBODIMENTS

Figure 1:
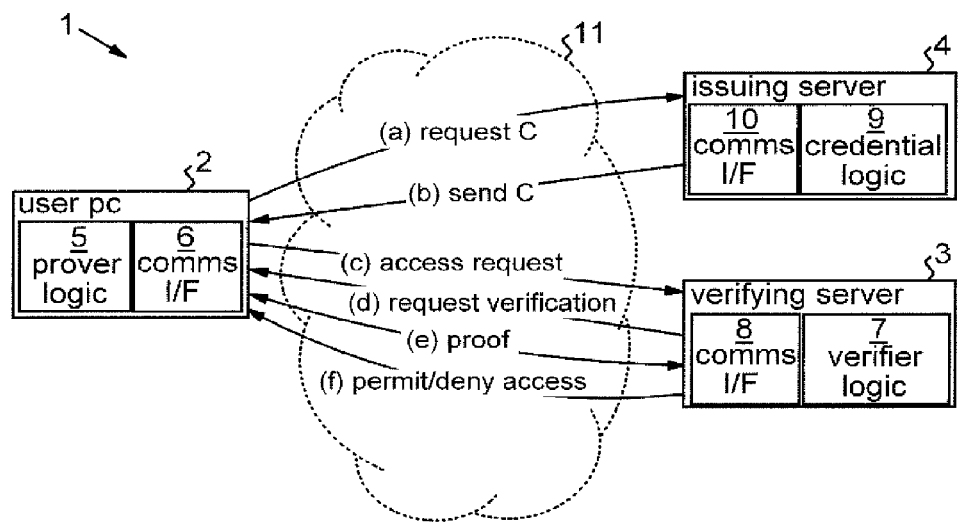
FIG. 1 shows an exemplary data processing system in which cryptographic credential systems embodying the present invention can be employed.

Proof methods embodying the present invention are based on the use of cryptographic credentials which encode attributes as prime numbers. Specifically, an attribute is encoded in a credential in the form of a prime number E which maps to that attribute according to a predetermined mapping of attributes to prime numbers. This forms the basis for efficient proofs as to whether an attribute encoded in the credential is a member of a given set, i.e. that the attribute is, or conversely is not, a member of that set. This is done by proving whether the prime number E encoded in the credential divides (i.e. is an integral factor of) the product value Q, where Q is the product of the prime numbers corresponding to the attributes in the set in accordance with the aforementioned mapping.

The positive proof is made by showing that E does divide the product value Q, and the negative proof by showing that E does not divide Q. The prime property of the encoded attribute values ensures that the divisibility of E into Q is determinative for the set membership proof in both cases. The proof is made while keeping the attribute in question secret, i.e. without revealing the attribute to the verifier. The prover demonstrates possession of a credential encoding a secret value, the prime number E, and that the secret value encoded in the credential divides the product value Q. This technique offers efficient set membership proofs, both positive and negative, in credential systems. For example, in preferred embodiments of the present invention the proofs take at most time and space that is logarithmic in the number of set elements. Embodiments of the present invention thus allow modules with limited computational capacity to cope with substantially large attribute sets.

In general, the proving and verifying modules can be implemented by any form of data processing module, component or system, and the cryptographic credential may be associated with a proving module in a variety of ways. For example, a credential could be recorded in a proving module, read by a proving module, or otherwise accessible to a proving module for the purpose of communicating with the verifying module.

The predetermined mapping of attributes to prime numbers will generally be known to the verifier, and is typically published for access by provers and/or verifiers. Thus a verifier might specify an attribute to be verified by specifying the corresponding prime, or, in the case of multiple attributes, the product x of the appropriate primes. Embodiments can be envisaged where the credential is supplied to the verifier such that the value E is revealed, in which case the step of proving whether e (or x) divides E could be performed by the verifier.

In preferred embodiments, the proving module demonstrates possession of the credential without revealing the value E to the verifying module. This provides the basis for zero-knowledge proofs and in particular allows the proving module to demonstrate possession (or not) of a particular attribute or attributes without revealing any other attributes encoded in the credential.

Also, the product value Q might therefore be calculated by the prover or the verifier. Hence the step of determining the product value Q at the proving module can be achieved in a variety of ways, for example by receiving this value from the verifying module or by calculating this value for a list of attributes supplied by the verifying module.

Methods embodying this aspect of the present invention exploit cryptographic credentials generated by methods embodying the first aspect of the present invention to prove that a user possesses one or more attributes in a given set, e.g. on a particular list of attributes, without revealing the attribute(s) in question. This is done by proving knowledge of a secret number d which divides both the value E encoded in the credential and the product Q of the prime numbers which map to respective attributes in the set in accordance with the aforementioned mapping. The existence of this number proves that one or more of the attributes encoded in the credential must be on the list. The proof can be made for a single attribute, in which case the secret number d will be the prime number e encoding that attribute, or a plurality of attributes, in which case the number d will be the product of the primes encoding those attributes.

Methods embodying the present invention can implement proofs for more than one user attribute. In particular, a plurality of attributes may be encoded in a credential as respective prime numbers according to the defined mapping of attributes to primes. A proof that more than one of the encoded attributes is or is not a member of the given set could then be made by performing the divisibility proof described above individually for each attribute.

Alternatively, it can be proved that a plurality of attributes encoded in the credential are all members of the set by (a) calculating an attribute product X being the product of the respective prime numbers encoding the attributes in question according to the defined mapping, and (b) proving that the attribute product X divides the product value Q. The prime property of the encoded attribute values means that if X divides Q then each individual attribute value must also divide Q, and hence that each attribute is a member of the specified set.

The cryptographic credential will usually encode other elements in addition to the prime number(s) encoding the attribute(s), a typical example being a secret (private) key of the user. In general, the prime number(s) could be encoded in any desired manner in the credential, though preferred embodiments encode each prime number as an exponent in a discrete logarithm representation. Various techniques can also be used for generating the cryptographic credential, though this is conveniently done by producing a cryptographic signature on a message encoding the product. Particularly preferred embodiments employ an anonymous credential system based on Camenisch-Lysyanskaya signatures as described further below.

The present invention also extends to data processing systems including proving and verifying modules as described above. Moreover, it is to be understood that, in general, where features are described herein with reference to an embodiment of one aspect of the present invention, corresponding features may be provided in embodiments of another aspect of the present invention.

The preferred embodiments of the present invention detailed below employ a cryptographic credential system based on Camenisch-Lysyanskaya signatures. These are described in detail in: "A Signature Scheme with Efficient Protocols", J. Camenisch and A. Lysyanskaya, in S. Cimato, C. Galdi and G. Persiano editors, Security in Communications Networks, Third International Conference, SCN 2002, volume 2576 of Lecture Notes in Computer Science, pages 268-289, Springer Verlag, 2003; and "Efficient Non-transferable Anonymous Multi-show Credential System with Optional Anonymity Revocation", J. Camenisch and A. Lysyanskaya, in B. Pfitzmann, editor, Advances in Cryptology—EUROCRYPT 2001, volume 2045 of Lecture Notes in Computer Science, pages 93-118, Springer Verlag, 2001. A brief description of the properties of Camenisch-Lysyanskaya signatures is given below to assist understanding of the embodiments to be described.

Assumptions: Strong RSA Assumption (See A method for obtaining Digital Signatures and public-key Cryptosystems, R. L. Rivest, A. Shamir, L. Adleman, Communications of the ACM, 21(2):120-126. February 1978.): given an RSA modulus n and a random element $g \chi Z^*_n$, it is hard to compute $h \chi Z^*_n$ and integer $e>1$ such that $h^e \equiv g \mod n$. The modulus n is of a special form pq, where $p=2p'+1$ and $q=2q'+1$ are safe primes.

Integer Commitments: We recall the Pederson commitment scheme (as detailed in "Non-interactive and Information-theoretic Secure Verifiable Secret Sharing", T. P. Pedersen, in J. Feigenbaum, editor, Advances in Cryptology—CRYPTO '91, volume 576 of Lecture Notes in Computer Science, pages 129-140, Springer Verlag, 1992) in which the public parameters are a group G of prime order q, and generators $(g_0, \ldots, g_m)$. In order to commit to the values $(v_0, \ldots, v_m) \chi Z_q$, pick a random $r \chi Z_q$ and set $C = \text{Com}(v_0, \ldots, v_m; r) = g_0^r \Pi_{i=1}^m g_i^{v_i}$.

Damgård and Fujisaki ("An integer commitment scheme based on groups with hidden order", I. Damgård and E. Fujisaki, http://eprint.iacr.org/2001, 2001) show that if the group G is an RSA group and the committer is not privy to the factorization of the modulus, then in fact the Pedersen commitment scheme can be used to commit to integers of arbitrary size.

Discrete-Logarithm-Based, Zero-Knowledge Proofs: The Camenisch-Lysyanskaya signature scheme makes use of several known results for proving statements about discrete logarithms. When referring to such proofs, we will follow the notation introduced by Camenisch and Stadler (J. Camenisch and M. Stadler. "Efficient Group Signature Schemes for Large Groups", J. Camenisch and M. Stadler, in B. Kaliski, editor, Advances in Cryptology—CRYPTO '97, volume 1296 of Lecture Notes in Computer Science, pages 410-424, Springer Verlag, 1997) for various proofs of knowledge of discrete logarithms and proofs of the validity of statements about discrete logarithms. For instance, $$PK\{(\alpha,\beta,\delta): y = g^\alpha h^\beta \cdot \tilde{y} = \tilde{g}^\alpha \tilde{h}_\beta \cdot (u/\alpha/v)\}$$

denotes a "zero-knowledge Proof of Knowledge of integers $\alpha$, $\beta$, and $\delta$ such that $y=g^\alpha h^\beta$ and $\tilde{y}=\tilde{g}^\alpha \tilde{h}_\beta$ holds, where $u[\alpha[v$ and where $y$, $g$, $h$, $\tilde{y}$, $\tilde{g}$, $\tilde{h}$ are elements of some groups $G=\langle g\langle=\langle h\langle$ and $G=\rangle \tilde{g}\rangle=\rangle \tilde{h}\rangle$. The convention is that Greek letters denote quantities of which knowledge is being proved, while all other values are known to the verifier.

Application of the Fiat-Shamir heuristic ("How to Prove Yourself: Practical Solutions to Identification and Signature Problems", A. Fiat and A. Shamir, in A. M. Odlyzko, editor, Advances in Cryptology—CRYPTO '86, volume 263 of Lecture Notes in Computer Science, pages 186-194. Springer Verlag, 1987) turns such proofs of knowledge into signatures on some message m; denoted as, for example, $SPK\{(\alpha): y=g^\alpha\}(m)$. Given a protocol in this notation in the following description, the derivation of an actual protocol implementing the proof will be apparent to those skilled in the art.

Camenisch-Lysyanskaya Signatures: A minor and straightforward variant of the Camenisch-Lysyanskaya (CL) signatures discussed in "A Signature Scheme with Efficient Protocols" (referenced in full above) allows messages to be negative integers as well. Let $l_m$, $l_e$, $l_n$, $l_r$ and L be system parameters. $l_r$ is a security parameter, and the meanings of the others will become apparent in the following.

Key Generation: On input $l_n$, choose an $l_n$-bit RSA modulus n such that n=pq, p=2p'+1, q=2q'+1, where p, q, p', and q' are primes. Choose, uniformly at random, $R_0, \ldots, R_{L-1}$, S, $Z \chi QRn$. Output the public key (n, $R_0, \ldots, R_{L-1}$, S, Z) and the secret key p. Message space is the set $\{(m_0, \ldots, m_{L-1})\}$: $m_i \chi \{0,1\}^{l_m}$.

Signing Algorithm: On input $m_0, \ldots, m_{L-1}$, choose a random prime number e of length $l_e > l_m + 2$, and a random number v of length $l_v = l_n + l_m + l_r$, where $l_r$ is a security parameter. Compute $$A = \left(\frac{Z}{R_0^{m_0} \ldots R_{L-1}^{m_{L-1}} S_v}\right)^{\frac{1}{e}} \mod n.$$

The signature consists of (e, A, v).

Verification Algorithm: To verify that the tuple (e, A, v) is a signature on message $(m_0, \ldots, m_{L-1})$, check that $Z \equiv A^e R_0^{m_0} \ldots R_{L-1}^{m_{L-1}} S^v (\mod n)$, $m_i \in \pm \{0,1\}^{l_m}$ and $2^{l_e} > e > 2^{l_e-1}$ holds.

Proving Knowledge of a Signature: A prover can prove possession of a CL signature without revealing any other information about the signature. If A was a public value, we could do so by proving knowledge representation of Z with respect to $R_0, \ldots, R_{L-1}$, S and A. However, making A public would destroy privacy as that would make all transactions linkable. Luckily, one can randomize A: given a signature (A, e, v), the tuple (A':=AS$^{-r}$ mod n, e, v':=v+er) is also a valid signature as well. Now, provided that $A \chi \langle S \rangle$ and that r is chosen uniformly at random from $\{0,1\}^{l_n+l_\phi}$ the value is distributed statistically close to uniform over $Z_n^*$. Thus, the user could compute a fresh A' each time, reveal it and then run the protocols $$PK\{(\varepsilon, v', \mu): Z \equiv \pm R_0^{\mu_0} \ldots R_{L-1}^{\mu_{L-1}} A'^\varepsilon S^{v'} (\mod n) \wedge \mu_i \in$$
$$\pm \{0, 1\}^{l_m} \wedge \varepsilon \in [2^{l_e-1}+1, 2^{l_e}-1]\}$$

There is a technical consequence from this proof protocol regarding the statements $\mu_i \in \pm \{0,1\}^{l_m} \wedge \varepsilon \in [2^{l_e-1}+1, 2^{l_e}-1]$. While these can be implemented virtually free, they require that the actual secret lie in a smaller interval, i.e. the signer needs to choose e from $\lfloor 2^{l_e-1}-2^{l'_e}+1, 2^{l_e-1}+2^{l'_e}-1 \rfloor$ with $l'_e < l_e - l_\phi - l_H - 3$ where $l_\phi$ and $l_H$ are security parameters (the first controlling statistical zero-knowledge and the second being the size of the challenge message in the PK protocol). Similarly, we require $m_i \in \pm \{0,1\}^{l_m-l_\phi-l_H-2}$ when input to the signature scheme.

The CL Credential System and Attributes: The CL credential system can be used to encode attributes into credentials as follows. In the CL system, each user has a secret identity, i.e. a single secret key $s_U$. A credential issuing party now uses the CL signature scheme to sign the user's secret key as well as all attributes the issuer wants to assert about the user. This signing is of course done in a "blind" way such the issuer does not learn the user's secret key. Thus, the user will have obtained a signature (A, e, v) such that $Z \equiv \pm R_0^{s_U} R_1^{a_1} \ldots R_{L-1}^{a_{L-1}} A^e S^v$ (mod n) holds where $a_1, \ldots a_{L-1}$ are the attested attributes and (Z, $R_0, \ldots R_{L-1}$, S, n) are the issuer's public key. A user can show that she obtained a credential from some issuer and selectively reveal some of the attributes (or prove statements about them) using the proof of knowledge of a signature described above.

Referring to FIG. 1, a simple example is illustrated schematically of the basic techniques described above. These techniques are utilised in preferred embodiments of cryptographic credential systems which can be implemented in various data processing systems. The data processing system 1 includes a prover module 2, a verifier module 3 and an issuer module 4. Prover module 2 embodies a proving module implemented by prover logic 5 and a communications interface 6. Verifier module 3 embodies a verifying module implemented by verifier logic 7 and communications interface 8. Issuer module 4 includes credential logic 9 and communications interface 10. Modules 2, 3 and 4 can communicate over a network 11 via their respective communications interfaces. The control logic 5, 7, 9 of these modules is configured for implementing the appropriate steps of processes involving generation and issuing of cryptographic credentials, and making proofs about these credentials, as described in detail below. In general, this control logic may be implemented in hardware or software or a combination thereof, and the specific nature of the prover, verifier and issuer modules is largely irrelevant to fundamental operation of the cryptographic processes to be described. In this example, however, modules 2 to 4 are implemented by general-purpose computers, prover module 2 being a user pc and verifier and issuer modules 3, 4 being servers to which prover pc 2 can connect over network 11. Prover logic 5, verifier logic 7 and credential logic 9 are implemented here by respective computer programs which configure the host computers to perform the functions described. Suitable software will be apparent to those skilled in the art from the description herein.

In this illustrative scenario, the credential system is utilised in an access control process. In particular, in order for user pc 2 to access a service, such as a restricted web site, hosted by verifying server 3, prover logic 5 must demonstrate possession of an appropriate cryptographic credential issued by a trusted party, in this case issuing server 4. The basic steps of the access control process are as indicated by arrows (a) to (f) in FIG. 1.

In step (a), user pc 2 connects to issuing server 4 to request a credential C certifying a user attribute about which cryptographic proofs are subsequently to be made. Issuing server 4 then verifies the attribute for that user. This can be done in any desired manner, for example by verifying the user's identity and then accessing a secure database containing official information to confirm the user attribute in question. An appropriate credential C is then generated by credential logic 9 and transmitted over network 11 to user pc 2 as indicated by arrow (b). In step (c), user pc 2 connects to verifying server 3 via the network 11 to request access to the required service.

In step (d), verifier logic 7 sends a verification request to prover logic 5 asking for proof of possession of an appropriate credential. More specifically, prover logic 5 must prove to verifier logic 7 whether the attribute encoded in the credential is one of a list of attributes supplied by the verifier logic. Prover and verifier logic 5, 7 then communicate to effect the required cryptographic proof as indicated generally by arrow (e). In step (f), verifying server 3 permits or denies user pc 2 access to the restricted service according to whether or not a satisfactory proof has been made.

Figure 2:
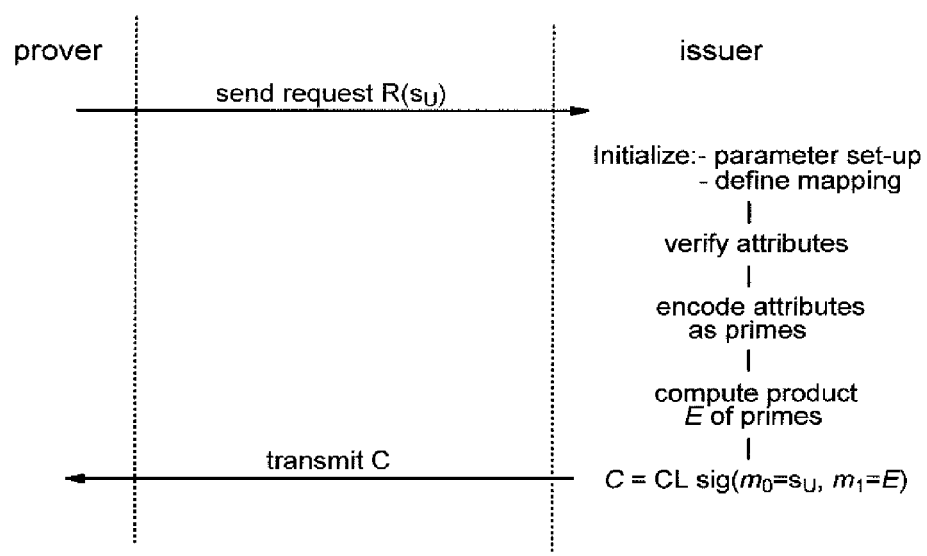
FIG. 2 illustrates steps involved in issuance of a credential in the FIG. 1 system.

Referring to FIG. 2, the process of issuing a credential C will now be described in more detail. FIG. 2 indicates the key steps performed by the prover logic 5 (prover) on the left of the figure and the credential logic 9 (issuer) on the right. Prior to operation, an initialization process is performed by issuer 9. This involves the set-up of parameters and keys, and the code definition for user attributes whereby the mapping of attributes to prime numbers is specified. In accordance with the process described earlier, the set up procedure is as follows. On input $l_n$, choose an $l_n$-bit RSA modulus n such that n=pq, p=2p'+1, q=2q'+1, where p, q, p', and q' are primes. Choose, uniformly at random, $R_0, \ldots, R_{L-1}, S, Z \chi QR_n$. In addition, we require bases g and h for integer commitment. For this we can use the issuer's RSA modulus as well, so let h and g be elements of $QR_n$.

The issuer's public key becomes (n, $R_0, \ldots, R_{L-1}$, S, Z, g, h). The code definition (mapping) is performed as follows. The number of bits that can be encoded into a message field of a CL signature is $l_m$ as described earlier, so we can only use primes of length up to $l_m$. We assume initially here that a single, finite-set attribute which can take at most k different values is to be encoded in a credential. The issuer thus chooses $l_m$ such that there exist k primes smaller than $2^{l_m}$. If $l_m$=16 for example, there are about 6000 16-bit primes which could then be used for attribute encoding. The issuer thus defines the mapping between the k possible values of the user attribute and respective prime numbers. This completes the initialization process.

The credential generation process is initiated in response to prover 5 issuing a request R for a credential as indicated in FIG. 2. The request R encodes the user's secret key $s_U$ as discussed earlier in such a manner that this key is not revealed to the issuer. In response, issuer 9 firstly verifies the attribute for the user as described above. Next, the attribute is encoded as its corresponding prime number E in accordance with the predefined mapping discussed above. Issuer 9 then generates the credential C by producing a CL signature on the prime number E. Thus, referring to the former technique for encoding attributes in CL credentials described above, the issuer includes the number E in the credential such that E will be one of the messages signed by the issuer. Specifically, we assume in this example that the credential C is a CL signature (A, e, v) on messages $m_0$ and $m_1$, with $m_1$=E and $m_0$ being the user's secret key $s_U$, i.e. $Z \equiv \pm R_0^{s_U} R_1^E A^e S^v \pmod{n}$ holds. The credential C thus generated is then transmitted by credential logic 9 to prover logic 5 of user pc 2.

The foregoing system provides the basis for exceptionally efficient proofs in step (e) of FIG. 1. As a first example consider that a positive proof is required here. That is, the prover logic 5 must prove to the verifier logic 7 that the credential C certifies an attribute which is on a specified list of attributes.

Figure 3:
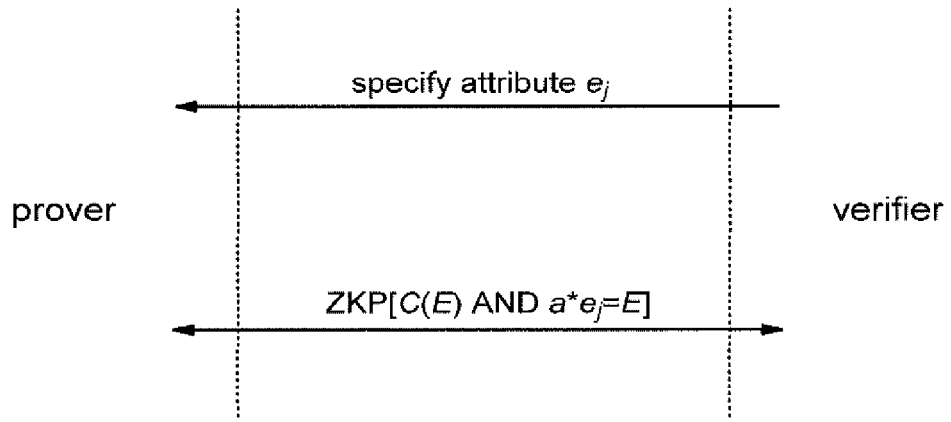
FIG. 3 illustrates steps involved in proving that the credential encodes an attribute on a list of attributes.

Referring to FIG. 3, the key steps are shown of this process performed by the prover logic 5 (prover) on the left and the verifier logic 7 (verifier) on the right. In the first step, verifier 7 specifies the list in question by supplying the list of prime numbers $e_1, \ldots, e_l$ encoding the attributes on the list according to the predefined mapping published by issuing server 4.

Next, prover 5 chooses a sufficiently large random r (about 80 bits larger than n) and computes a commitment $D = g^E h^r$ mod n. The commitment D is sent to verifier 7 in the second step shown in the figure, whereby the prover commits to the prime number E encoded in the credential without revealing the value E to the verifier; i.e., E remains secret to the prover. Next, prover 5 calculates the product value Q being the product of the supplied prime numbers $e_1, \ldots, e_l$ for the attributes on the list. Prover 5 then calculates the value a=Q/E. In the third step shown in the figure, the prover and verifier communicate to implement a zero-knowledge proof (ZKP) protocol.

In implementing this protocol, the prover demonstrates possession of a credential C encoding the same (secret) value E as that committed to in the commitment D by proving knowledge of a CL signature as described earlier. In addition, the protocol implements a zero-knowledge proof demonstrating knowledge by the prover of the secret value a which satisfies a*E=Q. This protocol is defined as follows, where the value a is represented by $\alpha$ here, the number E is represented by $\mu_1$, and $\mu_0$ is the secret key $s_U$:

$$PK\{(\epsilon, v', \mu_0, \mu_1, \rho, \alpha, \rho'): Z \equiv \pm R_0^{\mu_0} R_1^{\mu_1} A^\epsilon S^{v'} \pmod{n} \wedge D = g^{\mu_1} h^\rho \bmod n \wedge g^Q = D^\alpha h^{\rho'} \bmod n \wedge \mu_0 \in \pm \{0,1\}^{l_m} \wedge \mu_1 \in \pm \{0,1\}^{l_m - 3l_r} \wedge \epsilon \in [2^{l_e - 1}+1, 2^{l_e}-1]\}$$

The integer a can only exist if E is a factor of Q. Hence, proving knowledge of a proves that E does divide Q. The proof is therefore made that the credential C certifies an attribute on the required list without revealing that attribute to the verifier.

Figure 4:
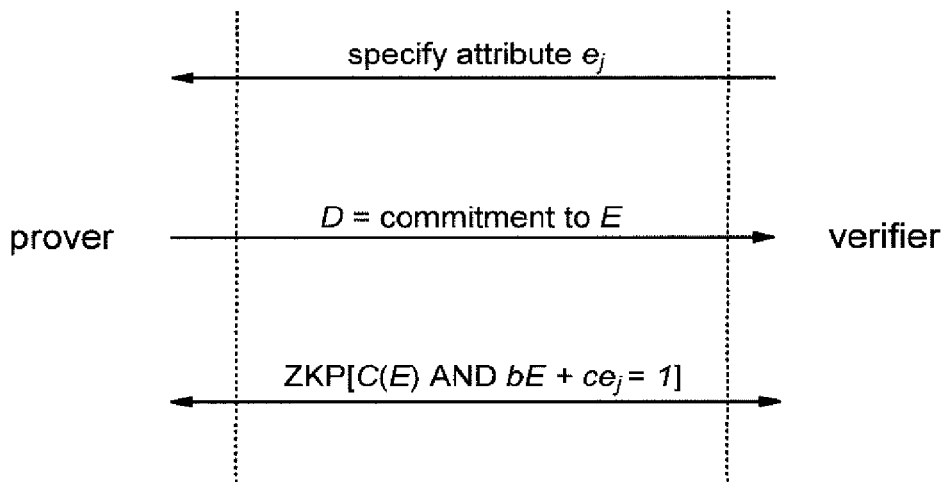
FIG. 4 illustrates steps involved in proving that the credential does not encode a specified attribute.
Figure 5:
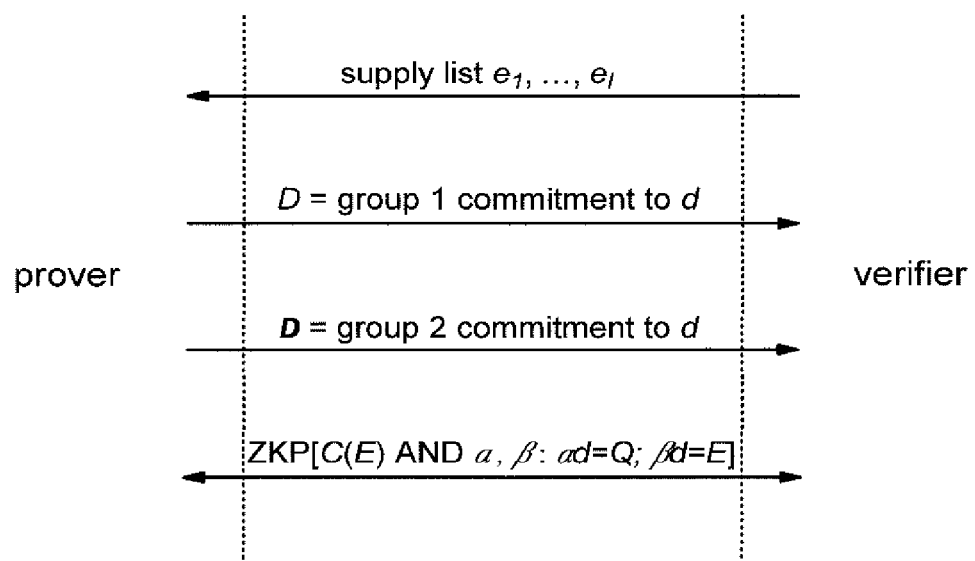
FIG. 5 illustrates steps involved in proving that the credential encodes one of a list of attributes.

Referring to FIG. 4, the second method enables the prover 5 to make a negative proof, i.e. that the credential C certifies an attribute which is not on the specified list of attributes. The first two steps shown in this figure are the same as those of FIG. 3. Prover 5 again calculates the product value Q being the product of the prime numbers $e_1, \ldots, e_l$ for the list of attributes. In addition, prover 5 calculates the values b and c such that b*E+c*Q=1 (the values b and c here can be efficiently computed with the extended Euclidian algorithm as will be apparent to those skilled in the art).

In the third step shown in the figure, the prover and verifier communicate to implement a zero-knowledge proof protocol. As before, this protocol demonstrates possession by the prover of a credential C encoding the secret value E committed to in commitment D. In addition, the protocol implements a zero-knowledge proof demonstrating knowledge by the prover of the secret values b and c such that b*E+c*Q=1. This protocol is as follows (where the secret values b and c are represented by α and β here):

$$PK\{(\epsilon,v',\mu_0,\mu_1,\rho,\alpha,\beta,\rho'):Z=\pm R_0^{\mu_0}R_1^{\mu_1}A^\epsilon S^{v'}$$
$$(\bmod n) \wedge D=g^{\mu_1}h^\rho \bmod n \wedge g=$$
$$D^\alpha(g^Q)^\beta h^{\rho'} \bmod n \wedge \mu_0\epsilon\pm\{0,1\}^{l_m} \wedge \mu_1\epsilon\pm$$
$$\{0,1\}^{l_m} \wedge \epsilon\epsilon[2^{l_e-1}+1,2^{l_e}-1]\}$$

The two integers b and c only exist if E is not a factor of the product value Q. Hence, proving knowledge of b and c proves that E does not divide Q. The proof is therefore made that the attribute certified by credential C is not on the specified list without revealing the attribute in question to the verifier.

It will be seen from the foregoing that, by encoding attributes as small prime numbers as described, both the positive and negative set membership proofs can be performed with exceptional efficiency. One only needs to prove possession of the credential C and then simple linear relation. The size of the elements a, b, c, E and Q depend on the number of attributes that one needs to be able to handle maximally. In particular, if one needs to be able to encode at most u different attributes (requiring u different primes), then E becomes about u*log u, i.e. about log u+log u bits. If the list has j elements, we additionally need to communicate about j log u bits. This is compared to j group elements required with the traditional methods discussed earlier, which is typically much more.

A plurality of attributes may of course be encoded in the credential C if desired. In this case, each of the attributes $a_1, \ldots, a_i$ can be encoded as a respective prime number $E_1, \ldots, E_i$ according to the defined mapping of attributes to primes. Each of the prime numbers $E_1, \ldots, E_i$ can then be encoded in the credential as a respective message $m_1, \ldots m_i$ of the message set on which the CL signature is generated. A proof that more than one of the encoded attributes is or is not on the specified list can be made simply by performing the proofs described above individually for each attribute as required.

Alternatively, it can be proved that a number of the encoded attributes are all on the list by using a modified form of the FIG. 3 method. The adaptation of the FIG. 3 method will be apparent to those skilled in the art from the following description. Suppose, for example, that the prover wishes to prove that two attributes $E_1$ and $E_2$ encoded in the credential C are both on the verifier's list. In this case, the prover calculates an attribute product X being the product of the prime numbers, here $E_1$ and $E_2$, about which the proof is to be made.

In the zero-knowledge proof protocol, the prover demonstrates possession of a credential C on each of the (secret) attribute values $E_1$ and $E_2$. In addition, the protocol proves knowledge by the prover of a secret integer a such that a*X=Q, and that the secret value X is the product of the attribute values $E_1$ and $E_2$. The prime property of the encoded attribute values $E_1$ and $E_2$ means that if X divides Q then each individual attribute value must also divide Q, and hence that each of the attributes is on the verifier's list.

Many changes can of course be made to the embodiments described above. By way of example, instead of defining the attribute list by supplying the list of primes $e_1, \ldots, e_j$ encoding the attributes, the list of attributes $a_1, \ldots, a_j$ could be provided. The prover could then use the published mapping to determine the encoded values $e_1, \ldots, e_j$ and hence the product value Q. Alternatively, for example, the verifier could simply supply the product value Q for the list in question.

In some embodiments, a credential C may be issued for a predetermined attribute or set of attributes. Alternatively, the user could specify the particular attributes to be encoded in a credential, selecting from a predetermined set of attributes which can be certified. A credential could also include other elements as well as the secret user key $s_u$ and encoded attribute value(s). These elements could then be included as additional messages $m_i, \ldots m_{L-1}$ in the CL signature. It will be understood, however, that the techniques described can be applied to credentials generated in other ways than by producing a CL signature.

It will of course be appreciated that, while the credential system is described in the context of an access control scenario above, numerous other applications might employ such a credential system. The present invention can thus be employed in a variety of data processing systems other than the specific example of FIG. 1. In some embodiments, the issued credential may be recorded and supplied to the user on information storage medium such as a chip, card, or electronic memory module. This can then be read by a suitable reader module for use of the credential in subsequent proofs. In some embodiments, the issuer and verifier may be the same entity, and in general the prover, verifier and issuer could be implemented by any form of computing module, component or system.

Other changes and modifications can be made to the exemplary embodiments described without departing from the scope of the invention.

What is claimed is:

1. A computer implemented method for generating a cryptographic credential for use in certifying a plurality of user attributes, the method comprising the steps of:
   receiving, in an issuing server, a request from a computer of a user for said cryptographic credential, wherein the request includes the plurality of attributes;
   verifying the plurality of attributes with a verification request sent by a verifying server, wherein the verification request includes a list identifying one or more of the plurality of attributes and the prime numbers associated with each attribute;
   encoding, using said computer of a user, each attribute as a prime number in accordance with a predetermined mapping of attributes to prime numbers;
   requesting access to a specified service using said computer of a user;
   calculating, using said computer of a user, the product of the prime numbers encoding the attributes; and
   generating, using said computer of a user, an encoding of said product, thus producing the cryptographic credential for use in said certification to grant access to said specified service.

2. A method according to claim 1 wherein the step of generating comprises encoding said product as an exponent in a discrete logarithm representation.

3. A method according to claim 1 wherein the step of generating includes producing a cryptographic signature on a message encoding said product.

4. A method according to claim 1 further comprising the step of transmitting the cryptographic credential to a receiving module via a data communications channel.

5. A method according to claim 1 further comprising the step of recording the cryptographic credential on an information storage medium.

6. A non-transitory computer readable medium tangibly embodying computer executable program instructions for causing a computer to perform a method for generating a cryptographic credential certifying a plurality of user attributes according to claim 1.

7. A computer implemented method for determining, in a verifying module of a data processing computer system, whether a cryptographic credential associated with a proving module of the system certifies a specified user attribute, said cryptographic credential encoding the product E of a plurality of prime numbers each encoding a respective user attribute in accordance with a predetermined mapping of attributes to prime numbers, the method comprising the steps of:

receiving, in an issuing module, a cryptographic credential request from the proving module, which includes the specified user attribute;

sending a verification request from the verifying module to the proving module, wherein the verification request includes a list of at least the specified user attribute and the prime number associated therewith;

sending a request, from the proving module, to access a specified service by communicating with the verifying module to demonstrate possession of said cryptographic credential encoding said product E; and determining whether a prime number e encoding said specified attribute in accordance with said mapping divides the value E encoded in the credential, thus certifying the specified user attribute.

8. A method according to claim 7 for proving that the cryptographic credential does certify the specified attribute, the method including:

demonstrating possession of said credential without revealing said product E value to the verifying module; and communicating with the verifying module to prove knowledge of a secret number a such that $a*e=E$.

9. A method according to claim 7 for proving that the cryptographic credential does not certify the specified attribute, the method including:

demonstrating possession of said credential without revealing said product E value to the verifying module; and communicating with the verifying module to prove knowledge of secret numbers b and c such that $b*E+c*e=1$.

10. A method according to claim 7 including the further step of determining, in said computer, whether the product x of respective prime numbers encoding said plurality of attributes in accordance with said mapping divides the value E encoded in the credential.

11. A non-transitory, computer readable medium tangibly embodying computer executable program instructions for causing the computer to perform the steps of a process according to claim 7.

12. A computer implemented method for proving to a verifying module of a data processing computer system that a cryptographic credential associated with a proving module of the system certifies at least one of a predetermined set of user attributes, said cryptographic credential encoding the product E of a plurality of prime numbers each prime number encoding a respective user attribute in accordance with a predetermined mapping of attributes to prime numbers, the method comprising the steps of:

receiving, in an issuing module, a cryptographic credential request from the proving module;

sending a verification request from the verifying module to the proving module, wherein the verification request includes a list of at least one of the set of the predetermined user attributes and the prime number associated therewith;

sending a request, from the proving module, to access a specified service;

demonstrating to the verifying module possession of the cryptographic credential encoding E; and communicating with the verifying module to prove possession of a secret number d which divides both the value E encoded in the credential and a value Q that is the product of respective prime numbers encoding the attributes in said set in accordance with said predetermined mapping of attributes to prime numbers, thus proving said certification.

13. Apparatus for generating a cryptographic credential certifying a plurality of user attributes, the apparatus comprising a processor device and control logic configured to:

request the cryptographic credential;

receive a verification request that includes a list identifying one or more of the plurality of user attributes and the prime numbers associated therewith;

encode each attribute as a prime number in accordance with a predetermined mapping of attributes to prime numbers;

request access to a specified service;

calculate the product of the prime numbers encoding the attributes; and generate a cryptographic credential encoding said product.

14. Apparatus according to claim 13 wherein the control logic includes means adapted for generating the cryptographic credential by encoding said product as an exponent in a discrete logarithm representation.

15. A computer implemented method for determining in a verifying module of a data processing system whether a user attribute encoded in a cryptographic credential associated with a proving module of the system is a member of a predetermined set of user attributes, the cryptographic credential encoding said user attribute as a prime number E in accordance with a predetermined mapping of attributes to prime numbers, the method comprising the steps of:

receiving, in an issuing module, a cryptographic credential request, which includes the user attribute;

sending a verification request from the verifying module to the proving module, wherein the verification request includes a list identifying a list of at least one of the set of the predetermined user attributes and the prime number associated therewith;

sending a request, from the proving module, to access to a specified service;

determining, using said computer of a user, a product value Q which is the product of respective prime numbers corresponding to the attributes in said set in accordance with said predetermined mapping of attributes to prime numbers;

communicating with the verifying module to demonstrate possession of a cryptographic credential encoding a secret value that is said prime number E; and demonstrating to the verifying module that said secret value divides the product value Q, thus demonstrating that said user attribute is a member of said set.

16. A method according to claim 15 for proving that said user attribute is a member of said predetermined set, the method further including the step of communicating with the verifying module to prove knowledge of a secret number a such that $a*E=Q$.

17. A method according to claim 15 for proving that said user attribute is not a member of said predetermined set, the method including the further step of communicating with the verifying module to prove knowledge of secret numbers b and c such that $b*E+c*Q=1$.

18. A method according to claim 15 for proving that a plurality of user attributes, encoded in the cryptographic credential as respective prime numbers in accordance with said predetermined mapping, are each members of said set, the method further comprising the steps of:

communicating with the verifying module to demonstrate possession of a cryptographic credential encoding respective secret values that are said prime numbers encoding the plurality of user attributes;

calculating an attribute product X that is the product of the prime numbers encoding said plurality of user attributes; and communicating with the verifying module to prove knowledge of a secret number a such that a*X=Q.

19. A non-transitory, computer readable medium tangibly embodying computer executable program instructions for causing the computer to perform the steps of a process according to claim 15.

20. A computer implemented method for verifying at a verifying module of a data processing computer system whether a user attribute encoded in a cryptographic credential associated with a proving module of the system is a member of a predetermined set of user attributes, the cryptographic credential encoding said user attribute as a prime number E in accordance with a predetermined mapping of attributes to prime numbers, the method comprising the steps of:

receiving, in an issuing module, a request from the proving module for a cryptographic credential, wherein the request includes one or more user attributes;

receiving, in the proving module, a verification request that includes a list of at least one of the set of the predetermined user attributes and the prime number associated therewith;

communicating with the proving module to retrieve a request to access a specified service;

communicating with the proving module to verify possession by the proving module of a cryptographic credential encoding a secret value E; and communicating with the proving module to determine whether said secret value divides a product value Q that is the product of respective prime numbers corresponding to the attributes in said set in accordance with said predetermined mapping of attributes to prime numbers.

21. A method according to claim 20 for verifying that said user attribute is a member of said predetermined set, the method including communicating with the proving module to verify knowledge by the proving module of a secret number a such that a*E=Q.

22. A proving module of a data processing computer system for proving to a verifying module of the system whether a user attribute encoded in a cryptographic credential associated with the proving module is a member of a predetermined set of user attributes, the cryptographic credential encoding said user attribute as a prime number E in accordance with a predetermined mapping of attributes to prime numbers, the proving module comprising (i) a communications interface for communicating with the verifying module and (ii) control logic configured to:

request the cryptographic credential;

receive, in response to the cryptographic credential request, a list of at least one of the set of the predetermined user attributes and the prime numbers associated therewith;

determine a product value Q that is the product of respective prime numbers corresponding to the attributes in said set in accordance with said predetermined mapping of attributes to prime numbers;

request access to a specified service;

communicate with the verifying module via said communications interface to demonstrate possession of a cryptographic credential encoding a secret value that is said prime number E; and communicate with the verifying module via said communications interface to prove whether said secret value divides the product value Q.

23. A proving module according to claim 22 wherein the control logic is configured to communicate with the verifying module to prove knowledge of a secret number a such that a*E=Q.

24. A proving module according to claim 22 for proving that a plurality of user attributes, encoded in the cryptographic credential as respective prime numbers in accordance with said predetermined mapping, are each members of said set, the control logic being further configured to:

communicate with the verifying module to demonstrate possession of a cryptographic credential encoding respective secret values that are said prime numbers encoding the plurality of user attributes;

calculate an attribute product X that is the product of the prime numbers encoding said plurality of user attributes; and communicate with the verifying module to prove knowledge of a secret number a such that a*X=Q.

* * * * *